Sept. 21, 1965 R. BAJULAZ 3,207,292
CONVEYOR
Filed May 25, 1964 3 Sheets-Sheet 3
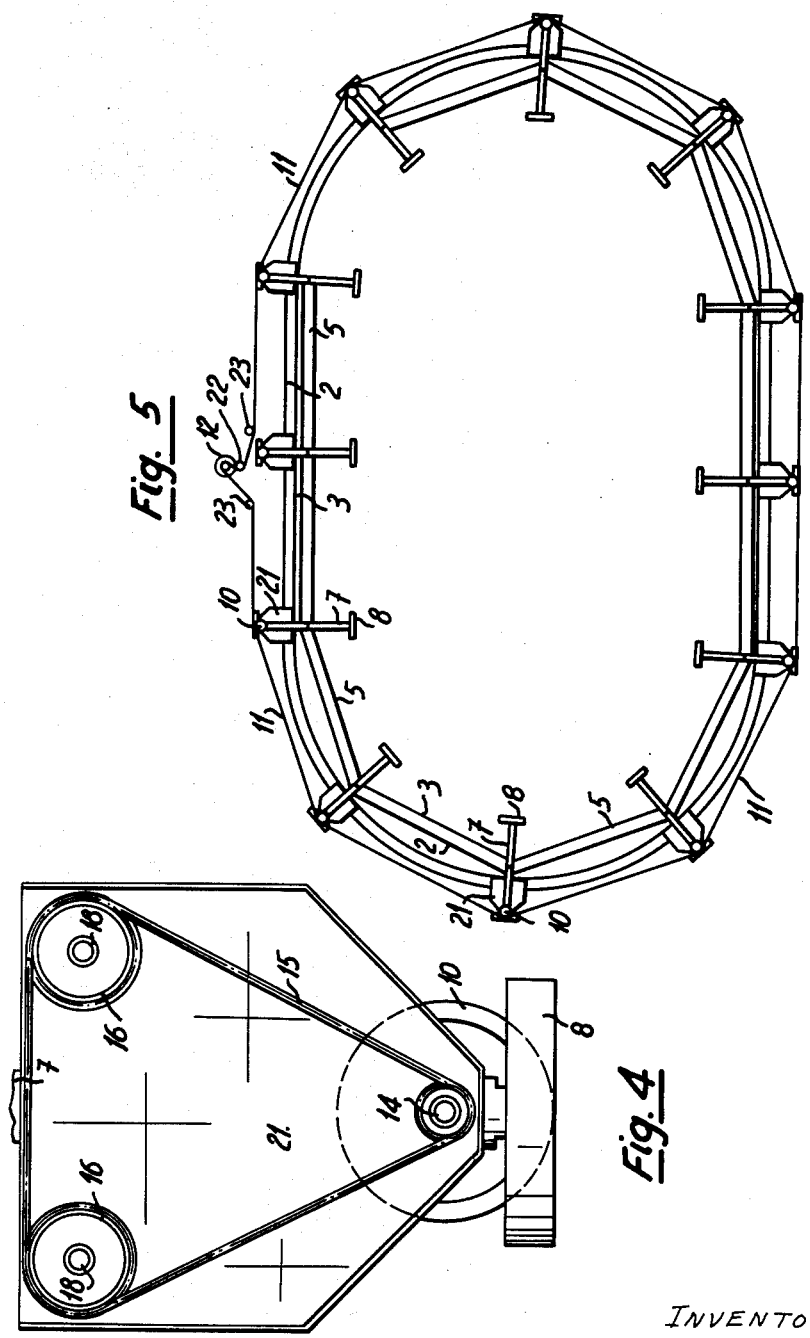
INVENTOR:
ROGER BAJULAZ
BY: Irvin S. Thompson
ATTORNEY

United States Patent Office 3,207,292
Patented Sept. 21, 1965

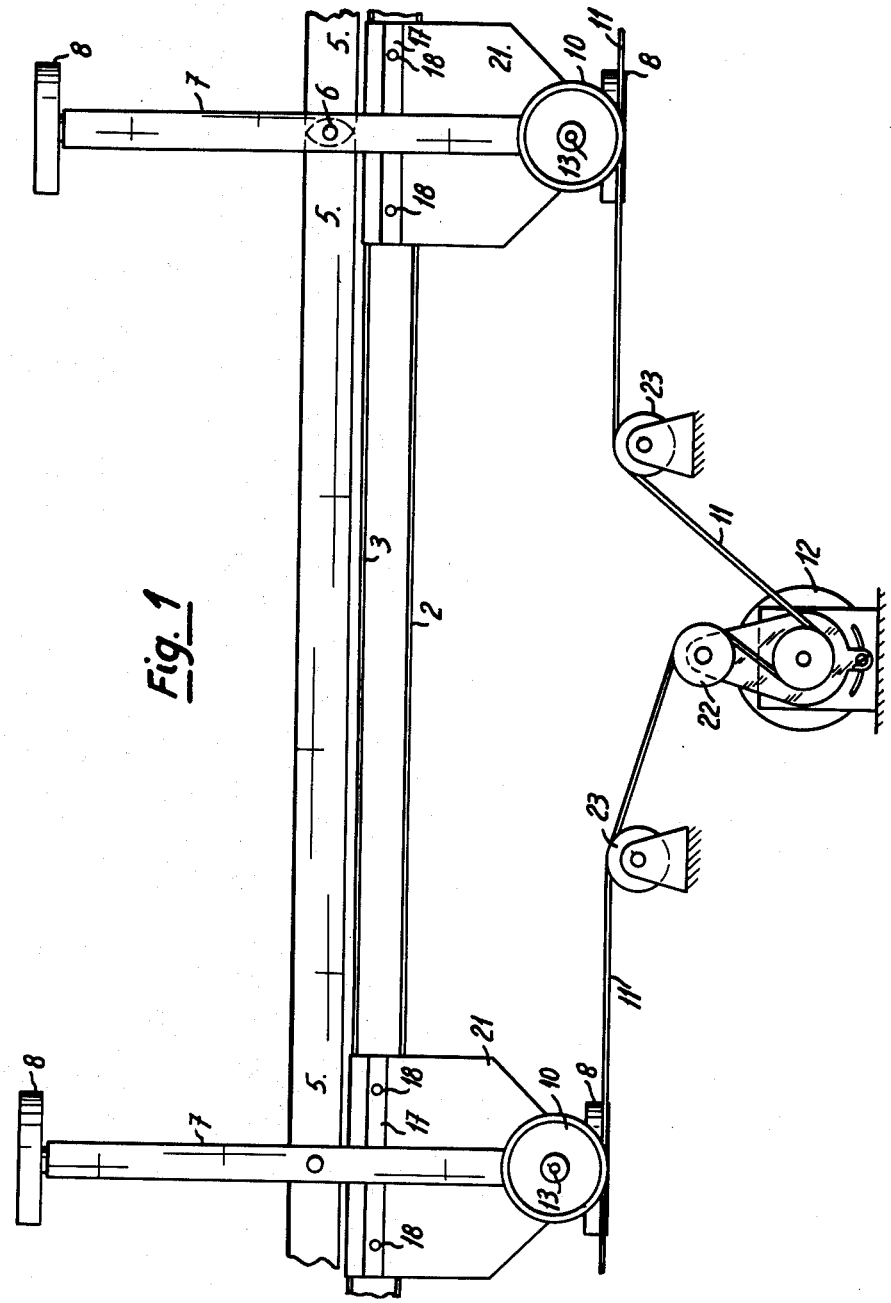

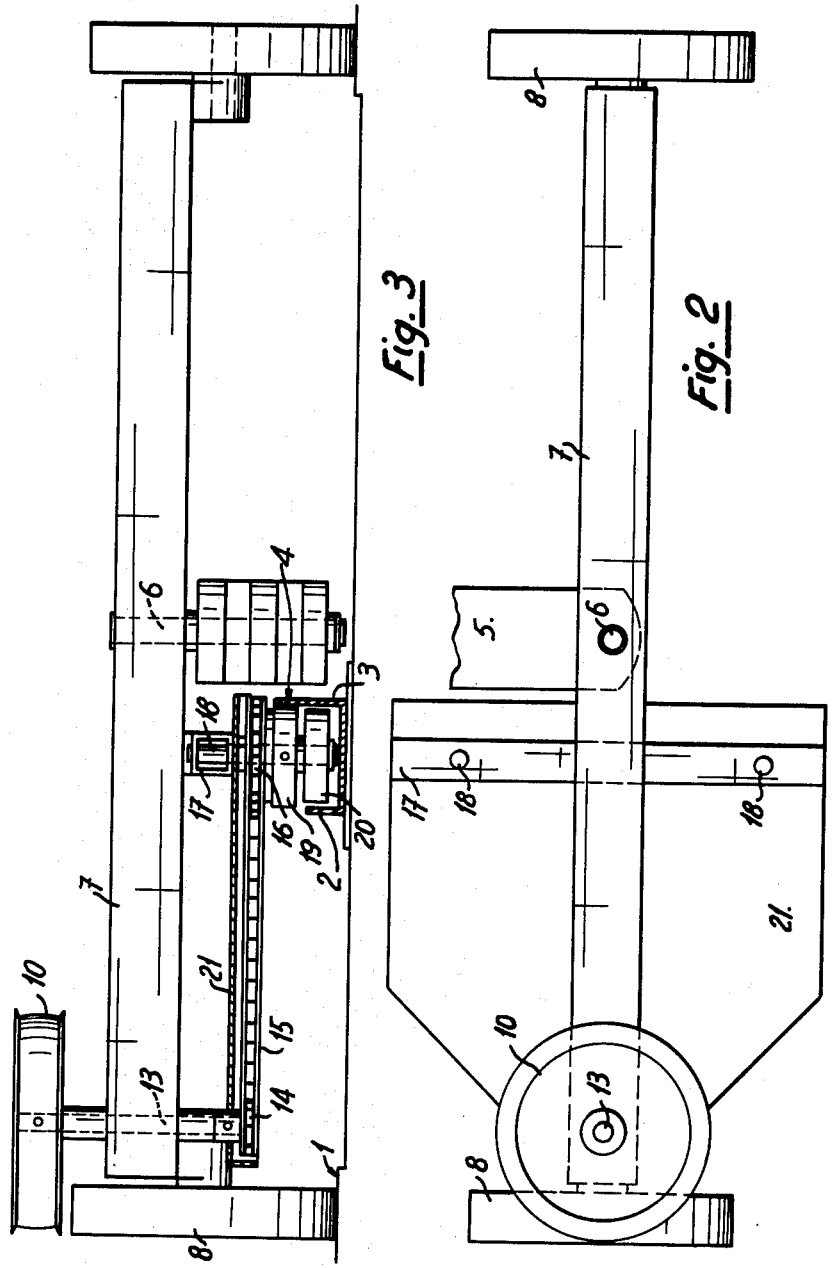

3,207,292
CONVEYOR
Roger Bajulaz, 13 Chemin Pierre Grise, Genthod, Geneva, Switzerland
Filed May 25, 1964, Ser. No. 369,992
Claims priority, application Switzerland, May 31, 1963, 6,873/63
15 Claims. (Cl. 198—203)

The present invention has for object a conveyor including at least one flexible driving member driven to rotate by means of a motor as well as a runway along which moving bodies move under the action of the said flexible member, characterized by the fact that each moving body comprises at least one pulley driven by the flexible driving member and driving the said moving body through the agency of a mechanical demultiplying device.

The accompanying drawing shows diagrammatically and by way of example one embodiment of the conveyor.

FIG. 1 shows in plan and in part, a succession of moving bodies as well as the device for driving the flexible member to rotate.

FIG. 2 shows in plan and on a larger scale the bogie of a moving body.

FIG. 3 shows in elevation and on a larger scale the bogie shown in FIG. 2.

FIG. 4 is a partial view from above of a bogie showing the mechanical reducing device.

FIG. 5 is a plan view showing a group of moving bodies driven along a closed runway.

The conveyor shown comprises a runway 1 of general oval shape closed on itself. In the example shown this runway is constituted by two plane surfaces. This conveyor also comprises secured to the ground and disposed between the two plane surfaces of the runway 1 and parallel to said runway a guiding rail 2 and a friction rail 3. Each of these guiding and friction rails are constituted by one of the flanges of a shaped piece having in section the general shape of a U, one flange 3 of which has a greater length than the other. It is obvious that the guiding and friction rails 2 and 3 could each be formed by an angle-iron. These guiding and friction rails 2 and 3 thus define a groove of relatively small width adapted to guide moving bodies and a stationary driving surface 4 formed by the upper inner part, extending above the said guiding groove, of the friction rail 3.

The conveyor shown further comprises a succession of moving bodies hinged one to the other and forming an interrupted train, that is to say the first moving body of which is not fixed to the last moving body. Each of these moving bodies comprises a beam 5 of square section, solid or hollow, and provided at each of its ends with a part of a coupling device.

This coupling device is constituted by a hinge connecting the beam 5 of a moving body to that of the following moving body. Each of these moving bodies further comprises a bogie pivoted relative to the beams 5 of two adjacent moving bodies. In fact, in the example shown, the axle 6 of the hinge constituting the coupling between two beams 5 is constituted by a pivot carried by the bogie.

Each bogie is constituted by a cross-piece 7 integral with the said axle 6 and carrying, pivoted at each of its ends, a wheel 8 resting on one of the running surfaces 1. These wheels 8 comprise tyres of rubber or any other synthetic or non-synthetic material, ensuring soft and silent running. In the example shown these wheels 8 pivot on shafts 9 parallel to the axis of the cross-piece 7 but placed below said cross-piece. This arrangement permits of providing a greater space to the ground below the cross-piece 7 for a same diameter of the wheels 8.

Each bogie further comprises a driving device for the moving body constituted by a pulley 10 adapted to be driven by a flexible driving member 11, endless in the example shown, itself driven to rotate by a motor 12. This pulley 10 is mounted on a vertical shaft 13 hinged near to one of the ends of the cross-piece 7, and carries at its other end a pinion 14. This pinion 14 is connected by a flexible member 15 to two pinions 16 hinged on a small beam 17 integral with the cross-piece 7 and disposed at right angle to said cross-piece. The axle 18 on which is secured each of the pinions 14, 16 extends downwardly and carries a driving roller 19 angularly integral with the said axle 18 and disposed in such a way that it is opposite to and in contact with the surface 4 of the driving rail 3.

The pulley 10 of each bogie is disposed above the cross-piece 7 and the wheel 8. In this way the endless flexible member 11, in contact with these pulleys 10, is situated through out its length above the moving bodies which offers certain advantages, the principal ones of which are:

(a) Reduction of the space to the ground of the moving bodies which confers better stability thereto.
(b) The flexible member 11 may be easily deviated with a view to its drive by the motor 12.
(c) No contaminating of the flexible member by grease, oil or other foreign body need to be feared.

A guiding roller 20 is idly hinged on the lower end of the axle 18 and has a diameter slightly less than that of the driving roller 19. This guiding roller is situated inside the groove formed by the guiding and friction rails 2 and 3. A protecting plate 21 is provided to cover the pinions 14, 16 as well as the flexible member 15.

The mechanical driving connection connecting the pulley 10 to the driving rollers 19 constitutes a mechanical speed reducing device so that the peripheral speed of the pulley 10 is equal to a multiple of that of the driving roller 19. In practice, the reduction ratio obtained is included between two and eight. In the preferred embodiment shown in the drawing, the pulley 10 comprises a curved peripheral surface and the pinions 14 and 16 are chain pinions interconnected by a chain. The driving roller 19 and the guiding roller 20 comprise a tyre of rubber or any other synthetic or natural material permitting of realizing both silent operation and satisfactory adherence between the driving roller 19 and the friction rail 3.

The drive of the moving bodies is effected by means of and endless flexible member 11, constituted in the example shown by a flat belt having a certain elasticity, surrounding the succession of moving bodies and entering into contact with the majority of the pulleys 10 of these moving bodies. This belt is itself driven to rotate by means of the motor 12 and an adjusting device 22 permits of adjusting the tension of the belt in order to ensure an adequate drive of the moving bodies.

The belt 11 is deviated at the point of its drive, by means of pulleys 23, in this way the belt 11 remains as much as possible on its path surrounding the moving bodies.

A particularly interesting embodiment of the conveyor has been described by way of example but it is obvious that numerous modifications could be foreseen without departing from the scope of the protection claimed. As a matter of fact, the beams 5 as well as the bogies may be of any shape. Furthermore, for special applications, in particular when, as shown, the moving bodies are connected one to the other, it is possible to effect the drive of these moving bodies on a certain portion only of the runway. This may be carried out either by maintaining at certain points the belt 11 out of contact with the pulleys 10 or by lowering the height of the friction rail 3 so as to remove, over certain sections of the path of the moving bodies, the surface 4 of this rail so that the driving roller 19 runs idle.

In other variants the friction rail and the driving roller could be eliminated. In this case the mechanical speed reducing device would drive one or both wheels 8. These wheels 8 would therefore be not only running wheels but also driving wheels.

In certain cases it may be necessary for reasons of safety of operation to duplicate the driving device. In these cases it is possible to provide on the shaft 13 a second pulley 10 disposed above the first pulley 10 and driven by a second flexible member 11, itself driven in a similar manner to the one already described. In another embodiment each of the flexible members could drive the moving bodies over only a portion of the runway.

Also in other variants the runway could be disposed not in a horizontal plane but in a helix for example, in which cause the belt 11 would also be disposed in a helix and could even extend over more than one turn of the said helix.

In certain cases where movements of small extent and of alternate directions would be applied to moving bodies it is possible to provide a flexible driving member which is not closed on itself. In fact, this flexible member could wind over drums at each of its ends.

Furthermore, the runway could also be open and not closed on itself, in this case it is obvious that the moving bodies would be driven by a belt 11 only over a part of their path. One or several other endless belts 11 may complete the installation in order to convey the moving bodies further.

In another variant, the belt 11 could be replaced by an endless cable. In this case the device for adjusting the tension of this cable would for example be constituted by counterweights.

In a still further variant each bogie could comprise only one wheel 8, for example disposed in the middle of the cross-piece 7 and rolling on a single running surface.

I claim:

1. In a conveyor device including at least one endless flexible driving member, a motor driving said endless flexible driving member, a runway and moving bodies rolling along said runway under the action of said endless driving member the combination of one pulley and one driving member rotatably mounted on each said moving bodies, said endless flexible driving member driving said pulley, a mechanical demultiplying device mechanically connecting each said pulley to said driving member of each said moving bodies.

2. A conveyor device as claimed in claim 1, in which said flexible driving member is constituted by an endless belt cooperating with said pulleys, said belt showing a certain elasticity providing the tension necessary for the drive of said moving bodies.

3. A conveyor devcie as claimed in claim 2, in which said mechanical demultiplying device comprises a pinion driven directly by the said pulley, and an endless member connecting the said pinion to at least one other pinion pivoted on the same moving body.

4. A conveyor device as claimed in claim 2, in which the mechanical demultiplying device connects drivingly the said belt driven pulley to at least one of the running wheels of the moving body.

5. A conveyor device as claimed in claim 1, comprising further a friction rail including a vertical driving surface extending parallel to the runway over at least a part of said runway.

6. A conveyor device as claimed in claim 5, which further comprises a guiding rail extending parallel to the friction rail over the whole length of the runway but the height of which is less than that of the friction rail.

7. A conveyor device as claimed in claim 6, in which said pinions pivoted to the moving body are disposed above the friction rail and are secured on axles extending downwardly and comprising each a guiding roller situated between the guiding rail and the friction rail and idly pivoted to the said axle.

8. A conveyor device as claimed in claim 7, and comprising further a driving roller rigidly fixed on each of these axles and cooperating with the said driving surface of the friction rail.

9. A conveyor device as claimed in claim 1, in which each of said moving bodies comprises at least one beam and one bogie, and in which further each beam is hinged relative to at least two bogies.

10. A conveyor device as claimed in claim 9, comprising further a train of moving bodies hinged one with respect to the other.

11. A conveyor device as claimed in claim 3, in which said endless member of said demultiplying device is constituted by a chain.

12. A conveyor device as claimed in claim 1, in which said flexible driving member is constituted by a cable.

13. A conveyor device as claimed in claim 1, in which said speed reducing deivce is constituted by a gear speed reducing device.

14. A conveyor device as claimed in claim 1, in which said gear reducing device is constituted by a belt speed reducing device.

15. A conveyor device as claimed in claim 1, in which said flexible driving member is disposed above the moving bodies.

References Cited by the Examiner

UNITED STATES PATENTS 2,745,542    5/56    Boots _____ 198—181

SAMUEL F. COLEMAN, *Primary Examiner.*